Mays & Bliss,
Metal Punch,
No. 3,231, Reissued Dec. 15, 1868.
Fig. 3.
Fig. 1.
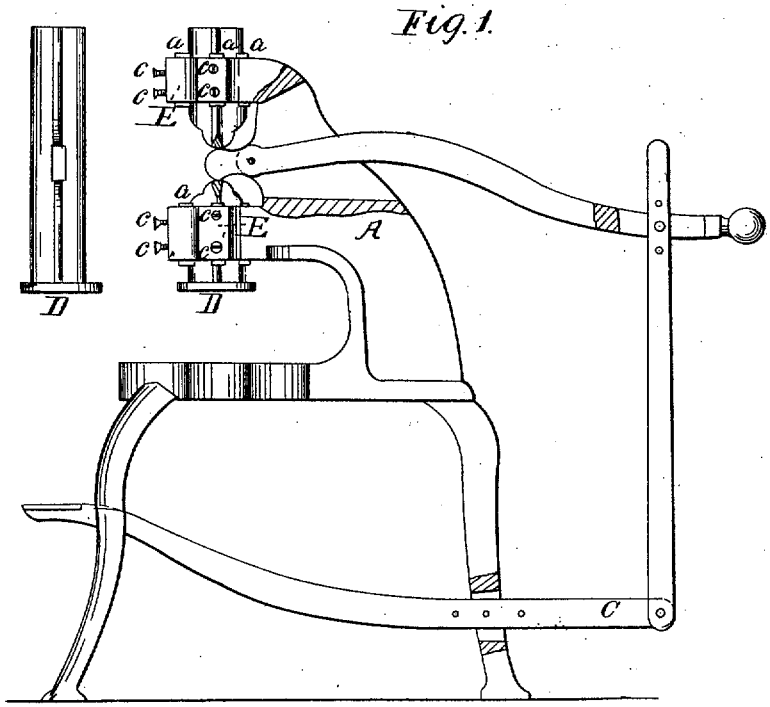
Fig. 2.
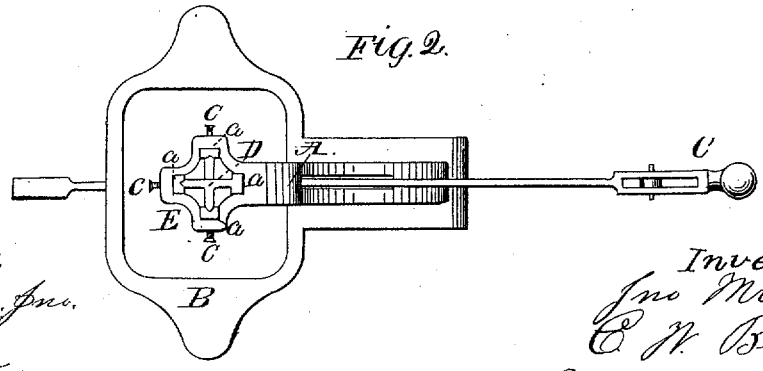
Witnesses.
Theo. Sueche. Jno.
Wm Freirin
Inventors
Jno Mays.
E. N. Bliss.
Per Munn & Co
Attys.
N. PETERS, PHOTO-LITHOGRAPHER, WASHINGTON, D. C.

United States Patent Office.

JOHN MAYS AND ELIPHALET W. BLISS, OF BROOKLYN, NEW YORK.

*Letters Patent No.* 73,823, *dated January* 28, 1868; *reissue No.* 3,231, *dated December* 15, 1868.

IMPROVEMENT IN DIE-PRESSES.

The Schedule referred to in these Letters Patent and making part of the same.

*To all whom it may concern:*

Be it known that we, JOHN MAYS and ELIPHALET W. BLISS, of Brooklyn, in the county of Kings, and State of New York, have invented a new and useful Improvement in Die-Presses; and we do hereby declare that the following is a full, clear, and exact description thereof, reference being had to the accompanying drawings, forming part of this specification, in which—

Figure 1 is a side view of our improved die-press, partly in section.

Figure 1 is a top view of the same.

Figure 3 is a detached view of the mandrel or slide.

In the construction of our improved die-press, the bed-plate B may be of any suitable form, supported upon legs G in a proper manner.

This bed-plate is cast solid with the standard A and boxes E, so as to be perfectly rigid under great strain.

These boxes are provided with brass gibs *a*, having set-screws *c*, for adjusting the gibs in the boxes, at pleasure.

The mandrel or slide D is made with wings, and, in transverse section, has the form of a cross, as seen in fig. 2.

Each wing of the mandrel has a V-shaped bearing, fitting into a corresponding bearing in the gib, as seen in fig. 2.

The mandrel may be worked by means of treadle C, in combination with the connecting-rod H and lever I, which is pivoted (at *i*, fig. 1) to the standard A, thus giving great power to the press; or the mandrel may be used with a screw-press or steam-press, or any other suitable construction.

By the above construction of solid boxes E, made in the same piece with the standard A and bed-plate B, in connection with the adjustable gibs *a*, our die-press is rendered very accurate and durable, as well as powerful and efficient for heavy work.

The wings upon the mandrel afford great stiffness and steadiness without great weight. The adjustable gibs and set-screws serve to adjust the mandrel, and to compensate for wear, whether the latter occurs more on one side, or upon all the wings alike.

We do not limit our invention to the use of the lever I for operating the press, as a screw or other power may be employed, and the construction may be somewhat varied. Three gibs, instead of four, would serve to secure the adjustability in every direction, and other variations may be made, and the press remain substantially the same.

Having thus fully described our invention,

What we claim, and desire to secure by Letters Patent of the United States, is—

1. So arranging the mandrel or slide, in combination with adjustable gibs, that either end of the mandrel can be separately adjusted in every direction, substantially as set forth.

2. The solid boxes E E, each holding and guiding one end of the mandrel, in combination with the sliding head D and the gibs *a a*, substantially as described.

3. The arrangement of the lever I between the boxes E E, in combination with the mandrel, substantially as set forth.

In witness whereof, we have hereunto set our hands, in the presence of two subscribing witnesses, this 29th day of May, 1868.

JOHN MAYS.
ELIPHALET W. BLISS.

Witnesses:
E. W. BLISS,
C. C. WUST.